(12) United States Patent
Houston et al.

(10) Patent No.: US 8,880,528 B2
(45) Date of Patent: Nov. 4, 2014

(54) INTELLIGENT CONTENT ITEM IMPORTING

(71) Applicant: Dropbox, Inc., San Francisco, CA (US)

(72) Inventors: Drew Houston, San Francisco, CA (US); Chris Beckmann, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 13/838,993

(22) Filed: Mar. 15, 2013

(65) Prior Publication Data

US 2014/0181157 A1 Jun. 26, 2014

Related U.S. Application Data

(60) Provisional application No. 61/745,525, filed on Dec. 21, 2012.

(51) Int. Cl.
*G06F 17/30* (2006.01)

(52) U.S. Cl.
CPC ............................... *G06F 17/30312* (2013.01)
USPC .......................................... 707/737; 707/812

(58) Field of Classification Search
USPC ............................ 707/812, 737; 382/118, 128
See application file for complete search history.

(56) References Cited

U.S. PATENT DOCUMENTS

| | | | |
|---|---|---|---|
| 2002/0029232 A1* | 3/2002 | Bobrow et al. | 707/517 |
| 2004/0004663 A1* | 1/2004 | Kahn et al. | 348/207.1 |
| 2004/0172419 A1* | 9/2004 | Morris et al. | 707/200 |
| 2007/0081707 A1* | 4/2007 | Sirohey et al. | 382/128 |
| 2008/0133697 A1* | 6/2008 | Stewart et al. | 709/217 |
| 2009/0061764 A1* | 3/2009 | Lockhart et al. | 455/3.06 |
| 2009/0234867 A1* | 9/2009 | Miyazawa et al. | 707/100 |
| 2010/0172551 A1* | 7/2010 | Gilley et al. | 382/118 |
| 2012/0124517 A1* | 5/2012 | Landry et al. | 715/810 |
| 2012/0266084 A1* | 10/2012 | Liao et al. | 715/753 |
| 2013/0055088 A1* | 2/2013 | Liao et al. | 715/730 |

* cited by examiner

*Primary Examiner* — Hung T Vy
(74) *Attorney, Agent, or Firm* — Novak Druce Connolly Bove + Quigg LLP

(57) ABSTRACT

Systems, methods, and computer-readable storage media for importing a new content item, such as a photo, document, video, email, or application, into a content item repository. A content item repository can contain a set of existing content item groups, and each content item group can include at least one content item. The system can calculate a profile for a new content item to be imported. Upon determining, based on the calculated profile, that the new content item exceeds a similarity threshold for an existing content item group, the system can insert the new content item into the content item group. Upon determining, based on the calculated profile, that the new content item does not exceed the similarity threshold for any existing content item group, the system can create a new content item group and insert the new content item therein.

20 Claims, 6 Drawing Sheets

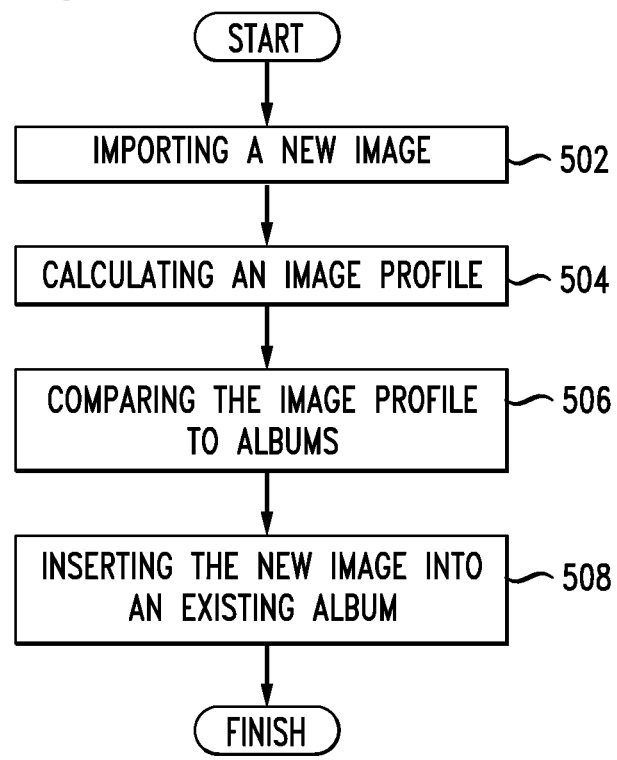

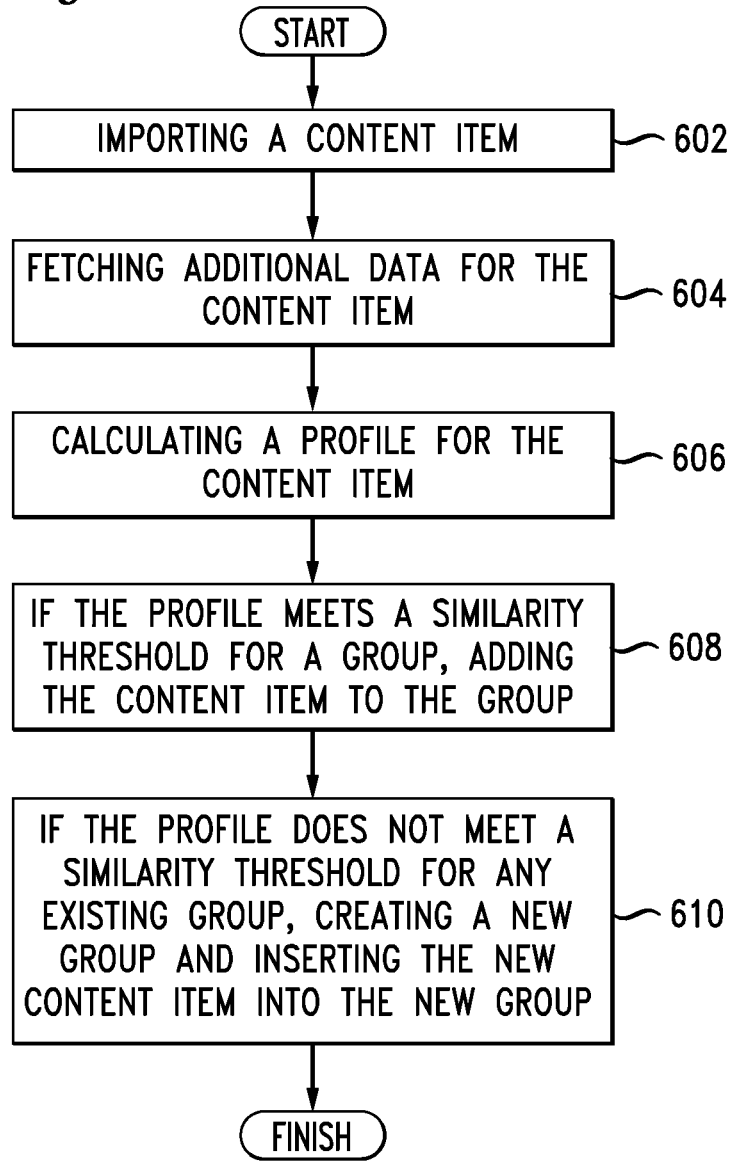

INTELLIGENT CONTENT ITEM IMPORTING

CROSS REFERENCE TO RELATED APPLICATIONS

This application claims the benefit of priority under 35 U.S.C. §119(e) to U.S. Provisional Patent Application No. 61/745,525, filed on Dec. 21, 2012, which is incorporated herein by reference in its entirety.

TECHNICAL FIELD

The present technology pertains to content item management, and more specifically pertains to organizing imported photos or other files.

BACKGROUND

Photography and imaging have undergone a huge transformation from film photography to digital photography in the last decade. Along with this transformation, many photo organization tools have been transformed, created, or updated to accommodate digital photos. For example, physical photo collections such as books as photo albums have been replaced with files and folders of photos, online photo collections, or local photo management applications. As another consequence of the digital photo revolution, users often take many more photos now than with film cameras because there is little or no additional cost associated with taking photos. Thus, the quantity of photos taken by users is exponentially higher, necessitating the development of additional photo organization tools. One common scheme is to organize photos into albums, or groups of related photos.

Users can manually organize photos, or photo management applications can provide some initial organization, such as organizing photos by the time and date the photos are imported into the photo management application. Organizing photos by import event is an improvement over no organization, but does not necessarily provide a very meaningful organization structure, and can actually lead to the user spending more time organizing photos. For example, a single import event may include photos that should be organized into multiple albums or multiple import events may include photos, or other types of content items, that should be organized into a single album.

Users often encounter similar problems when organizing imported items of other types besides photos, such as documents, electronic books, videos, emails, and so forth. For example, a user importing an archive of emails into an email management application only has a few options to organize them, such as organizing based on an existing folder structure, or organizing by date. Other organizations are difficult to arrange, and often require significant amounts of human interaction.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein. While some examples provided herein discuss content items as photos organized in albums, the same principles apply to other types of content items organized in to other types of groups, such as documents organized in to a workspace, video files organized in to a video presentation set, or emails organized into folders.

As a user imports a new content item into a storage area that contains or is associated with some previously organized content items, a content item import processor can compare the new content item to existing organizational units to determine if the new content item is a sufficient match for an existing organizational unit. The user can import new content items by uploading files through a web interface, for example, or by synchronizing files or folders with a content management platform. The user can also import content items by linking to a network address. For example, if the new content item is a document having a metadata tag indicating "Board Meeting Presentation Notes 2012," the content item import processor can determine that the new content item is a good match for an organizational group of content items titled "2012 Board Meeting Documents" based on a commonality of name. Based on that determination, the content item import processor can automatically add the new content item to that organizational group. Commonalities between an organizational group and a new content item can be based on multiple factors, and a new content item can be assigned to multiple different organizational groups at the same time. As the system adds new content items to organizational groups, the commonalities of content items in the organizational groups can change based on newly added content items.

The system can compare the new content item to organizational groups based on a similarity threshold. Each organizational group and content item attribute class can have its own similarity threshold for evaluating new content items. The system can provide a notification to the user that the new content item was added to an organizational group. The notification can include one or more reasons for selecting that organizational group, such as similar metadata, a similar file name, a specific date range, or a set of matching key words in the document. Further, the user can provide feedback for the organizational group or the reasons for selecting the organizational group. The system can use this feedback to improve algorithms for determining which groups, if any, are sufficiently similar to imported content items. If, however, the content item import processor does not find any organizational group that is a good match, the content item import processor can either create a new organizational group or leave the content item ungrouped. The system can flag ungrouped content items so a user can later decide whether to later manually group such content items.

The approaches set forth herein can be used to intelligently organize photos imported into a photo collection. In one aspect, the example system can provide organization assistance upon a photo import event, but can provide similar functionality at different points as well, such as processing a large library of unorganized photos or upon user request. The system can analyze a photo, such as a photo being imported, to determine if it matches certain criteria for inclusion in an existing album, and either include the photo in the existing album or create a new album. The system can import a new image from a photo capture device into a photo repository, wherein the photo repository contains a set of existing albums, and wherein each album in the set of existing albums includes at least one image, and calculates an image profile for the new image. For example, the image profile can be calculated based on at least one of image contents, image tags, location data, image title, file name, file location, folder structure, image rating, comments, image date, image time, image dimensions, bit depth, file format, camera make, camera model, camera information, or other metadata. The system can compare the image profile for the new image to combined image profiles of images associated with a respective album.

Upon determining, based on the image profile, that the new image exceeds a similarity threshold for an album of the set of existing albums, the system can insert the new image into the album. Upon determining, based on the image profile, that the new image does not exceed the similarity threshold for any of the set of existing albums, the system can create a new album and insert the new image into the new album. The system can generate a notification that the new image is inserted into the event, and transmit the notification to a client device, user, administrator, or event log. Similarly, the system can generate a notification that the new event has been created, and prompt a user to label the new event. In a slightly more complex variation, the system can determine, based on the image profile, that the new image exceeds a similarity threshold for a first event of the set of existing events and a second event of the set of existing events. Then the system can prompt the user to indicate which of the first event and the second event to insert the new image, and, based on feedback from the user, insert the new image into one of the first event or the second event.

In one variation specific to an online storage service, a server processing images imports a new image from a client into an online storage account, wherein the online storage account contains a set of existing events, and wherein each event in the set of existing events including at least one image. The server calculates an image profile for the new image, and compares that image profile with other images stored and profiled in the online storage account that are already organized into albums. Upon determining, based on the image profile, that the new image exceeds a similarity threshold for an event of the set of existing events, the server inserts the new image into the event. Upon determining, based on the image profile, that the new image does not exceed the similarity threshold for any of the set of existing events, the server creates a new event and inserting the new image into the new event.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 5 shows a first example method embodiment;

FIG. 6 shows a second example method embodiment;

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for importing content items, such as photos, in an organized way. For example, as a new photo or set of photos is imported, a photo management system can determine whether the photos belong to an existing album, or whether the photos belong in a new album. The system can make this determination based on a content analysis of the photos, or based on metadata or other information describing the photos, such as social network tags or file names. If the photos satisfy a similarity threshold for a particular album, the system can automatically add the photos to that album. If the photos satisfy the similarity threshold for multiple albums, the system can select a most likely album or can prompt the user to disambiguate or select one or more albums. If the photos fail to satisfy a similarity threshold for any available or existing albums, then the system can generate a new album and insert the photos into that new album. The system can further prompt the user to name the new album or provide some other information describing the album, such as settings or attributes for a similarity threshold for the new album. The user can manage similarity threshold strictness as well as attributes to which the similarity threshold applies on a per-album basis. These same principles can be applied to other file types or file collections as well, including file collections of multiple different file types.

Figure 1:
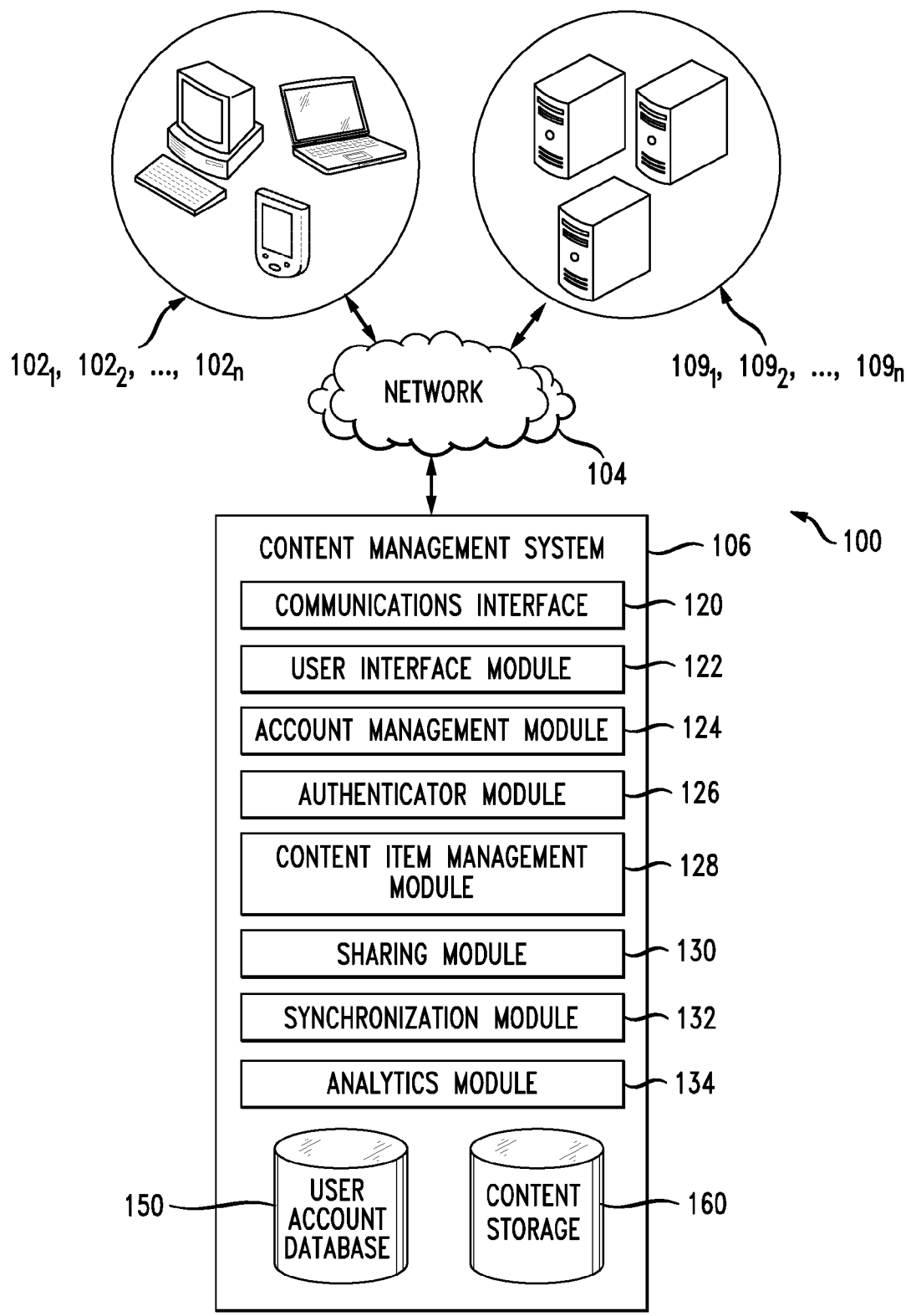
FIG. 1 shows an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1, 102_2, \ldots, 102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. Account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in content storage 160 made through the web interface, such as uploading a new version of a file, can be propagated back to other client devices 102 associated with the user's account. For example, multiple client devices 102, each with their own client software, can be associated with a single account and files in the account can be synchronized between each multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of content management system 106 is simply one possible configuration and that other configurations with more or less components are also possible.

Content management system 106 can include content item management module 126 that intelligently organizes content items into collections, albums, or events. A system, method and computer-readable media are disclosed that automatically determine whether to categorize, include, or otherwise associate a content item with an existing collection or event, or whether to create a new collection or event for the photo. While these principles are frequently discussed in terms of organizing photos into albums, the same principles can be applied to other data types, such as documents, emails, videos, audio, computer programs, and so forth, with appropriate changes in processing the file contents, metadata, or organizational units. For example, instead of organizing photos into albums, the system can organize documents into workspaces, videos into genres or video albums, music into playlists, or emails into topics.

In these examples, when content management system 106 imports a new content item, content item management module 128 can scan the content item for specific keywords, content item structure, or metadata such as an author or revision, for example. Content item management module 128 can compare information describing the content item or described within the content item to profiles of content item workspaces. When content item management module 128 determines that the content item is sufficiently similar to a particular content item workspace, content item management module 128 can automatically add that content item to the content item workspace. When content item management module 128 does not find a content item workspace that matches within a desired or indicated threshold, content item management module 128 can prompt the user to add the content item to a new workspace. Content item management module 128 can automatically generate the new workspace immediately, or generate the new workspace after prompting the user to name the new workspace, for example. In one variation, content item management module 128 can notify the user that the content item did not match a workspace and will not be added to any workspace until the user takes further action.

In addition to photo albums and content item workspaces, content item management module 128 can process multimedia albums containing multiple different types of files. The threshold similarity to automatically import a content item into such a multimedia album may be universal, in which case content item management module 128 can optionally adapt the universal threshold to different file types. In another variation, the multimedia album can be associated with multiple similarity thresholds, each of which is associated with importing content items of a particular type.

Figure 2:
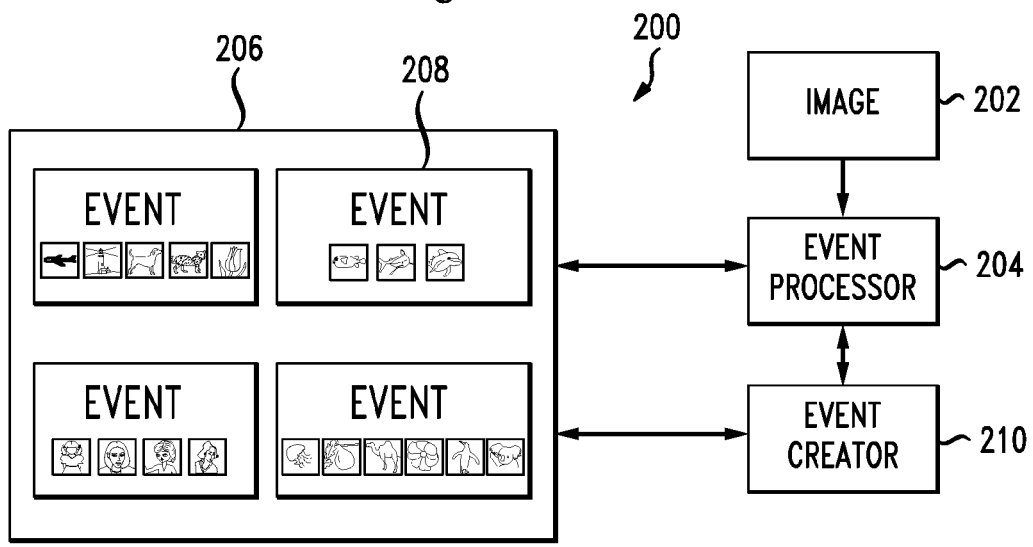
FIG. 2 shows an example organization of photos in to events or albums.

FIG. 2 shows an example organizational structure 200 of photos into events or albums as one example of a specific type of content items and a specific organizational group. In structure 200, event processor 204 receives image 202 or photo. Event processor 204 can be part of a local photo management application and/or part of a content management platform, such as content management system 106. Event processor 204 can analyze image 202, and can optionally analyze any available metadata describing image 202. Event processor 204 can compare image 202 to collection 206 of events 208 or albums. Collection 206 can contain multiple different events 208, each of which can contain different images. Collection 206 may represent a logical organization or groupings of images. Events 208 can be user created, system created, or some combination thereof, such as a user rearranging a system-generated event. In one embodiment, each event 208 can have a signature or identity based on information within the event, such as a particular geographic location, a collection of camera settings, a group of recognized faces, a specific time or date range, metadata, photo tags, and so forth. Event processor 204 can examine incoming image 202 and compare a signature for image 202 to the signatures of the various events 208 in collection 206. If event processor 204 determines that incoming image 202 corresponds to one of existing events 208, Event processor 204 can insert, assign, or otherwise associate incoming image 202 with the matching event. If event processor 204 determines that incoming image 202 does not have a sufficient correspondence to any of existing events 208, event processor 204 can invoke event creator 210 to generate a new event into which to insert incoming image 202.

As a practical example, image 202 can be a photo from a Christmas party. Event processor 204 can receive the photo, and compare the photo to existing albums 208. Event processor 204 can determine that an existing album contains photos from the same day, with the same geolocation metadata, and includes face recognition data that matches faces recognized in photo 202. Event processor 204 can then automatically add the photo to that album. Event processor 204 can compare incoming image 202 to the existing albums using similarity thresholds. The user can configure a general similarity threshold or album-specific similarity thresholds.

Event processor 204 can analyze similarity of actual photo contents and/or similarity of metadata describing the photo content. Additionally, event processor 204 can examine external sources of data that can provide additional insight into event groupings. For example, event processor 204 can examine calendar data of a user to determine a time range or a likely time range of an event. For example, the user's calendar may indicate travel to and from Florida, so photos from within that time range are more likely to be added to an existing "Florida Vacation" album. However, in some instances calendar data does not reflect a user's actual actions or participation in an event. For example, a user may have a meeting scheduled on her calendar, but due to traffic or an emergency she may not actually attend the meeting. So the system can further examine an available geolocation data history, such as may be provided by the user's smartphone, to determine how long she was actually at a given calendar event, if at all. Similarly, event processor 204 can handle photos differently that were taken on weekends as opposed to weekdays, or that were taken on holidays as opposed to non-holiday times. For example, event processor 204 can apply a relaxed standard for grouping photos taken over a time period spanning Friday early afternoon to Sunday evening to accommodate a logical grouping of all activities in a weekend under a single 'weekend' album or event.

Figure 3:
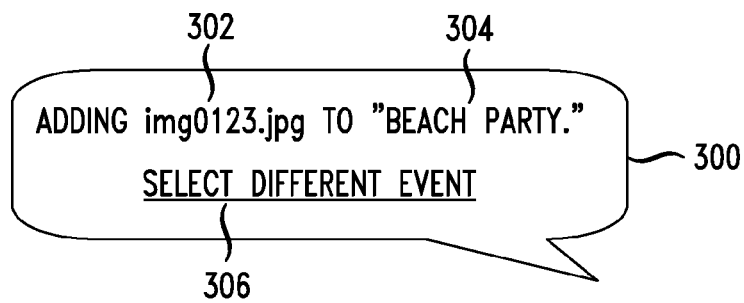
FIG. 3 shows an interactive notification of adding an imported image to an existing event.

When the system decides to include an incoming photo to an existing photo album, the system can provide a notification to the user so that the user is aware of the action taken. Otherwise, the user may not know in which album or event to look for a particular photo. FIG. 3 shows interactive notification 300 for adding an imported image to an existing event. Interactive notification 300 is illustrated as a popup in a desktop operating system, but similar principles can be applied to interactive notifications in other environments, such as a web-based interface, a mobile device, email notifications, and so forth. Interactive notification 300 can include an indication of image 302 that is the subject of the notification, as well as a target event or album 304. The indication can be text-based, a thumbnail, or an animated preview of image 302 or album 304, for example. The system can provide an equivalent notification in a non-graphical environment, such as via a spoken dialog interface. A non-interactive notification can provide this information as well. However, interactive notification 300 can allow the user to interact, such as by providing a button for the user to select a different album or event 306. When the user clicks the button or provides other input indicating a desire to select a different event, the system can allow the user to select a different album from a list directly within the area of interactive notification 300, or can open a dialog or interface in a different window or application, for example.

In a different variation when the incoming photo is a potential match for any of a group of events or albums, interactive notification 300 can include a disambiguation interface, such as a list of the group of events or albums. The user can select a desired one from the list of events or albums to which to add the incoming photo. The user can optionally indicate that none of the events or albums are correct, and create a new album directly in interactive notification 300. Interactive notification 300 can provide an indication of a default event or album into which the incoming photo will be added if the user provides no input selecting an event or album.

Figure 4:
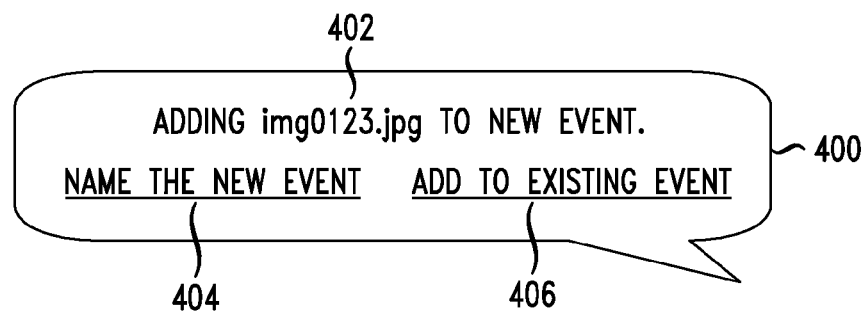
FIG. 4 shows an interactive notification of adding an imported image to a new event.

FIG. 4 shows interactive notification 400 for adding an incoming image to a new event. Interactive notification 400 can indicate image 402 in question, and provide a button or link to name the new event or album 404. In case the user decides that image 402 should instead be associated with an existing album, interactive notification 400 can provide a link to add the image to an existing event or album 406. Interactive elements 404, 406 are depicted as occurring side by side in a same popup, but the system can present interactive elements 404, 406 to the user in different windows or different notifications. Alternatively, the system can present interactive elements 404, 406 in series. For example, the system can first display interactive element 404 to the user, and if the user dismisses interactive element 404, the system can display interactive element 406 to the user.

Having disclosed some system components and concepts, the disclosure now turns to the example method embodiments shown in FIGS. 5 and 6. For the sake of clarity, the methods are described in terms of an example system 100, as shown in FIG. 1, configured to practice the method. The steps outlined herein are examples and can be implemented in any combination thereof, including combinations that exclude, add, or modify certain steps. The system can import a new image 502 from a photo capture device into a photo repository, wherein the photo repository contains a set of existing albums, and wherein each album in the set of existing albums can include at least one image. The system can calculate an image profile 504 for the new image. For example, the image profile can be calculated based on at least one of image contents, image tags, location data, image title, file name, file location, folder structure, image rating, comments, image date, image time, image dimensions, bit depth, file format, camera make, camera model, camera information, or other metadata. When dealing with content items other than images, the profile can be based on other types of information describing the content item or depicted within the content item itself. The system can compare the image profile for the new image to combined image profiles of images associated with a respective album.

Upon determining, based on the image profile, that the new image exceeds a similarity threshold for an album of the set of existing albums, the system can insert the new image into the album 506. Upon determining, based on the image profile, that the new image does not exceed the similarity threshold for any of the set of existing albums, the system can create a new album and insert the new image into the new album 508. The system can generate an optional notification that the new image is inserted into the event, and transmit the notification to a client device, user, administrator, or event log. Similarly, the system can generate a notification that the new event has been created, and prompt a user to label the new event. In a slightly more complex variation, the system can determine, based on the image profile, that the new image exceeds a similarity threshold for a first event of the set of existing events and a second event of the set of existing events. Then the system can prompt the user to indicate which of the first event and the second event to insert the new image, and, based on feedback from the user, insert the new image into one of the first event or the second event.

FIG. 6 shows a second method embodiment directed to importing content items, which can include photos or other types of data, such as documents, applications, text, video, and so forth. An example system configured to practice this method can first import a new content item 602 from a client into an account, wherein the account contains a set of existing groups, and wherein each group in the set of existing groups includes at least one content item. Then the system can optionally fetch additional data 604 for the content item, such as metadata, tags, file attributes, an associated user account, and so forth, in order to calculate or determine a profile 606 for the new content item. Upon determining, based on the profile, that the new content item exceeds a similarity threshold for a group of the set of existing groups, the system can insert the new content item into the group 608. However, upon determining, based on the profile, that the new content item does not exceed the similarity threshold for any of the set of existing groups, the system can create a new group 610 and insert the new content item into the new group.

Figure 7A:
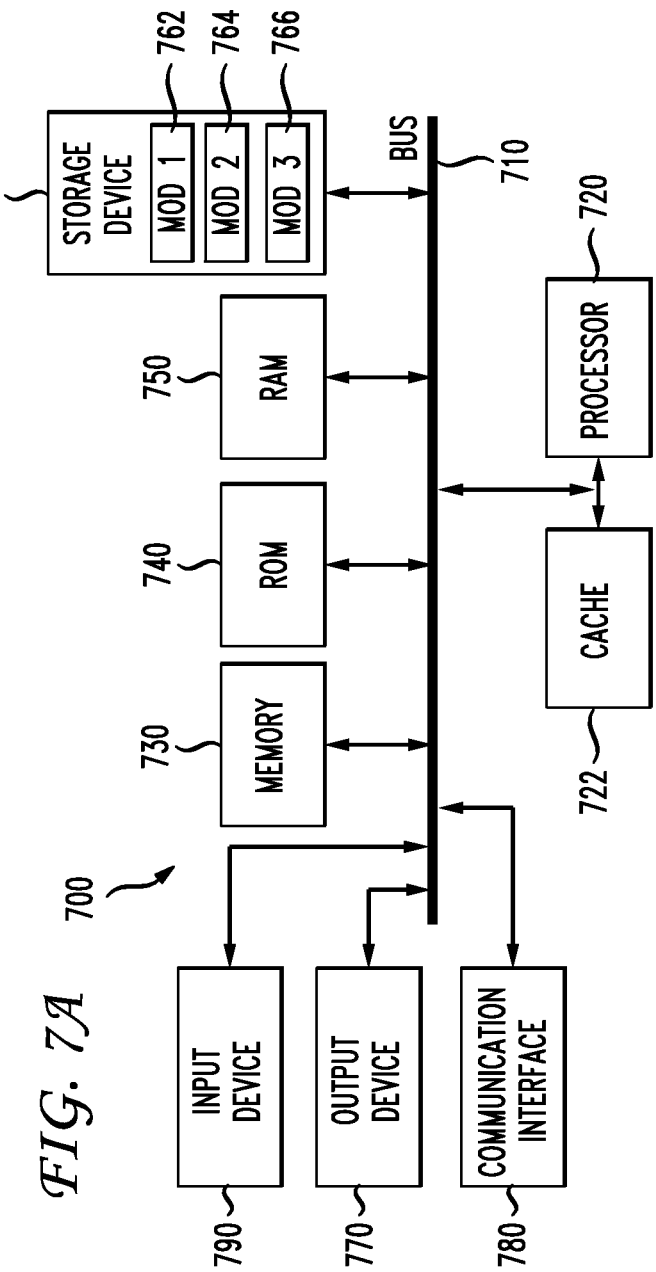
FIG. 7A shows a conventional system bus computing system architecture.
Figure 7B:
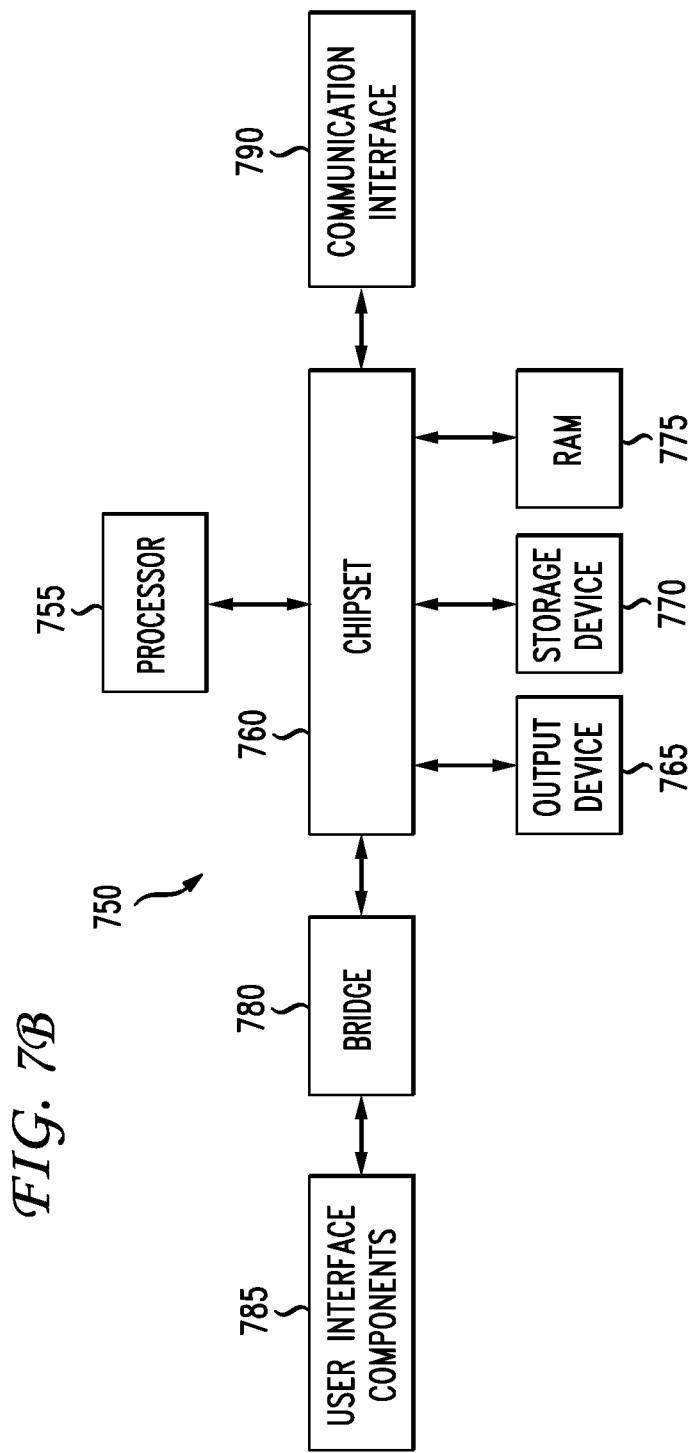
FIG. 7B shows a computer system having a chipset architecture.

FIG. 7A, and FIG. 7B show exemplary possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A system comprising:
   a processor; and
   a computer-readable storage medium having stored therein instructions which, when executed by the processor, cause the processor to:
   import a new content item from a client into an online storage account, wherein the online storage account contains a set of existing storage groups, and wherein each group in the set of existing storage groups comprises at least one content item;
   calculate a profile for the new content item to yield a calculated profile;
   compare the calculated profile with a similarity threshold for each group of the set of storage groups with each similarity threshold based on one or more user defined metadata attributes associated with the at least one content item in the storage group on a per storage group basis;
   upon determining that the calculated profile of the new content item exceeds a similarity threshold for a group, insert the new content item into that group, notify the client via an email message that the new content item is inserted into that group, the email message containing a thumbnail of the new content item and a name of the group containing the content item; and upon determining that the calculated profile of the new content item does not exceed the similarity threshold for any of the set of existing groups, create a new group and insert the new content item into the new group.

2. The system of claim 1, wherein the email message includes a prompt to select a different group.

3. The system of claim 1, further comprising instructions for causing the processor to:

upon determining that the new content item does not exceed the similarity threshold, notify the client that the new group has been created.

4. The system of claim 3, further comprising instructions for causing the processor to:

prompt the user to label the new group.

5. The system of claim 1, wherein the profile is calculated based on at least one of content item contents, content item tags, location data, content item title, file name, file location, content item rating, comments, content item date, content item time, content item dimensions, bit depth, file format, camera make, camera model, or camera information.

6. The system of claim 1, further comprising instructions for causing the processor to:

determine, based on the profile, that the new content item exceeds a similarity threshold for a first group of the set of existing groups and a second group of the set of existing groups;

prompt the client to indicate which of the first group and the second group to insert the new content item; and based on feedback from the client, insert the new content item into one of the first group or the second group.

7. The system of claim 1, wherein determining whether the new content item exceeds the similarity threshold for a respective group is based on combined content item profiles of content items associated with the respective group.

8. A computer-implemented method comprising:

receiving, by a processing device, a new image to be imported into a photo repository, wherein the photo repository contains a set of existing albums, and wherein each album in the set of existing albums comprises at least one image;

calculating, by a processing device, an image profile for the new image;

comparing, by a processing device, the calculated image profile with similarity thresholds for each album of the set of existing albums in the repository with each similarity threshold based on one or more user defined metadata attributes associated with the at least one image in the album on a per album basis;

upon determining that the calculated image profile exceeds a similarity threshold for an album of the set of existing albums, inserting the new image into that album, notify the client via an email message that the new content is inserted into that group, the email message containing a thumbnail of the new content item and a name of the group containing the content item; and upon determining that the calculated image profile does not exceed the similarity threshold for any of the set of existing albums, creating a new album and inserting the new image into the new album.

9. The computer-implemented method of claim 8, wherein the email message includes a prompt to select a different group.

10. The computer-implemented method of claim 8, further comprising upon determining that the image profile does not exceed the similarity threshold:

notifying the client that the new event has been created.

11. The computer-implemented method of claim 10, further comprising:

prompting the user to label the new event.

12. The computer-implemented method of claim 8, wherein the image profile is calculated based on at least one of image contents, image tags, location data, image title, file name, file location, image rating, comments, image date, image time, image dimensions, bit depth, file format, camera make, camera model, or camera information.

13. The computer-implemented method of claim 8, further comprising:

determining, based on the image profile, that the new image exceeds a similarity threshold for a first event of the set of existing events and a second event of the set of existing events;

prompting the client to indicate which of the first event and the second event to insert the new image; and based on feedback from the client, inserting the new image into one of the first event or the second event.

14. The computer-implemented method of claim 8, wherein determining whether the new image exceeds the similarity threshold for a respective event is based on combined image profiles of images associated with the respective event.

15. A non-transitory computer-readable storage medium having stored therein instructions which, when executed by a processor, cause the processor to:

import a new image from a client into a synchronized online storage account, wherein the synchronized online storage account contains a set of existing storage groups, wherein each storage group in the set of existing storage groups comprises at least one image;

calculate an image profile for the new image;

compare the image profile with a similarity threshold for each group of the set of storage groups with the similarity threshold based on one or more user defined metadata attributes associated with the at least one image in the existing storage group on a per storage group basis, notify the client via an email message that the new content is inserted into that group, the email message containing a thumbnail of the new content item and a name of the group containing the content item;

upon determining that the image profile of the new image exceeds a similarity threshold for a storage group, insert the new image into that storage group; and upon determining that the image profile of the new image does not exceed the similarity threshold for any of the set of storage groups, create a new storage group and insert the new image into the new storage group.

16. The non-transitory computer-readable storage medium of claim 15, wherein the email message includes a prompt to select a different group.

17. The non-transitory computer-readable storage medium of claim 15, having stored therein instructions which, when executed by a processor, further cause the processor to:

notify the client that the new event has been created.

18. The non-transitory computer-readable storage medium of claim 17, having stored therein instructions which, when executed by a processor, further cause the processor to:

prompt the user to label the new event.

19. The non-transitory computer-readable storage medium of claim 15, wherein the image profile is calculated based on at least one of image contents, image tags, location data, image title, file name, file location, image rating, comments, image date, image time, image dimensions, bit depth, file format, camera make, camera model, or camera information.

20. The non-transitory computer-readable storage medium of claim 15, having stored therein instructions which, when executed by a processor, further cause the processor to:
- determine, based on the image profile, that the new image exceeds a similarity threshold for a first event of the set of existing events and a second event of the set of existing events;
- prompt the client to indicate which of the first event and the second event to insert the new image; and
- based on feedback from the client, insert the new image into one of the first event or the second event.

* * * * *